United States Patent [19]
Nikles

[11] 3,737,283
[45] June 5, 1973

[54] FLUIDIZED SOLIDS REACTOR
[75] Inventor: Frank G. Nikles, Nazareth, Pa.
[73] Assignee: Fuller Company, Catasauqua, Pa.
[22] Filed: Nov. 26, 1971
[21] Appl. No.: 202,196

[52] U.S. Cl..................432/58, 431/170, 34/57 A, 239/423, 432/15
[51] Int. Cl...........................C22b 1/10, F27b 15/10
[58] Field of Search..................263/21 A; 431/170, 431/179, 7, 187, 188; 34/57 A; 239/423, 424

[56] References Cited
UNITED STATES PATENTS

| | | | |
|---|---|---|---|
| 3,544,093 | 12/1970 | Fisher | 263/53 |
| 3,092,166 | 6/1963 | Shepherd | 158/11 |
| 2,933,259 | 4/1960 | Raskin | 239/423 |
| 748,177 | 12/1903 | Edwards | 239/423 |

Primary Examiner—John J. Camby
Assistant Examiner—Henry C. Yuen
Attorney—Jack L. Prather

[57] ABSTRACT

A fluidized solids reactor which is capable of using either a gaseous fuel or a liquid fuel. The reactor employs a fuel system capable of supplying either a gas or a liquid to novel nozzles. The nozzles disperse the fuel throughout the fluidized bed of pulverulent material. Each nozzle includes a pair of concentric tubular members each opening into the fluidized bed. When gas is used as fuel, it is supplied to the outer tube. When oil is used as a fuel, it is supplied to the inner tube of the nozzle and air under pressure is also supplied to the inner tube. In addition, when liquid fuel is used, air under pressure is supplied to the outer tube for cooling the inner pipe.

6 Claims, 4 Drawing Figures

PATENTED JUN 5 1973　　3,737,283

FLUIDIZED SOLIDS REACTOR

BACKGROUND OF THE INVENTION

The present invention relates to a fluidized solids reactor and in particular to a reactor employed for carrying out a thermal reaction within a fluidized mass of pulverulent material wherein combustion takes place within the fluidized bed.

Fluidized solids reactors of the type to which the present invention relates have, prior to the present invention, been designed to operate on either a gaseous fuel or a liquid fuel. So far as I know, no prior reactor is available which is capable of operating on either a liquid fuel and a gaseous fuel utilizing a common burner nozzle. It is important in many locations to be able to operate on both types of fuel. During certain periods of operation, it may be most economical to operate using a gaseous fuel such as natural gas. However, at other times, the natural gas may not be available in the necessary quantities or at an economical price and it becomes necessary to use a liquid fuel such as oil. In order to make a particular installation economically feasible in this type of location, it would be desirable to have a reactor which can be switched from gas fuel to liquid fuel and back to gas fuel on a short notice, and if possible, without shutting down the reactor.

In order to efficiently carry out thermal reactions within a fluidized bed, it is necessary to have burning take place throughout the fluidized bed. In view of this, it is necessary to disperse fuel to be burned in the bed throughout the bed as quickly as possible. In order to do this, it has been found desirable to supply the fuel through the permeable grid which supports the fluid bed rather than through the sidewalls of the vessel. Such an arrangement is shown in U. S. Pat. No. 3,361,539. When supplying fuel through the gas permeable grid, it has been found desirable to disperse the fuel outwardly and upwardly into the fluid bed when it is discharged from the fuel supply pipes into the fluid bed in order to avoid localized burning and insure burning throughout the bed. In addition, by dispersing the fuel as it is discharged from the fuel nozzles, the fuel will not tend to pass directly through the fluid bed to the freeboard area above the bed. If the fuel passes through the bed to the freeboard, excessive burning will take place in the freeboard where it will not be useful in carrying out a thermal reaction on pulverulent material within the fluid bed. The use of a fuel nozzle which is adapted for use with both gaseous and liquid fuels has the advantage of permitting better placement of the nozzles. This is particularly advantageous when the fuel is supplied through the reactor grid. Heretofore, no successful dual fuel arrangement has been provided for dispersing a liquid fuel such as oil and a gaseous fuel such as natural gas throughout the fluidized bed of the reactor while permitting the fuel to be supplied through the reactor grid.

SUMMARY

It is the principal object of this invention to provide a fluidized solids reactor which is capable of using either a gas or liquid fuel wherein either fuel may be supplied to the reactor through the same nozzles.

It is another object of this invention to provide a fuel nozzle for use with a fluidized solids reactor which is capable of supplying either gas or liquid fuel to the reactor.

It is another object of this invention to provide a fuel nozzle for use with a fluidized solids reactor which is capable of dispersing either a gas or liquid fuel throughout the fluidized bed of the reacotr.

In general, the foregoing and other objects of this invention will be carried out by providing a fluidized solids reactor including a vessel, a gas-permeable grid mounted in and dividing said vessel into a lower plenum chamber and an upper material chamber and adapted to support a bed of pulverulent material in the material chamber, means for supplying gaseous fluid to the plenum chamber for passage through the gas-permeable grid to fluidize the bed of pulverulent material, an outlet for discharging spent fluidizing gas from the material chamber, and means for supplying fuel to the material chamber for combustion in the fluidized bed of pulverulent material comprising nozzle means flow connected with the means for supplying fuel for dispersing the fuel into the fluidized bed of material; means for selectively supplying gaseous fuel to said nozzle means; and means for selectively supplying liquid fuel to said nozzle means.

BRIEF DESCRIPTION OF THE DRAWINGS

The invention will be described in connection with annexed drawing wherein.

DESCRIPTION OF THE PREFERRED EMBODIMENT

Figure 1:
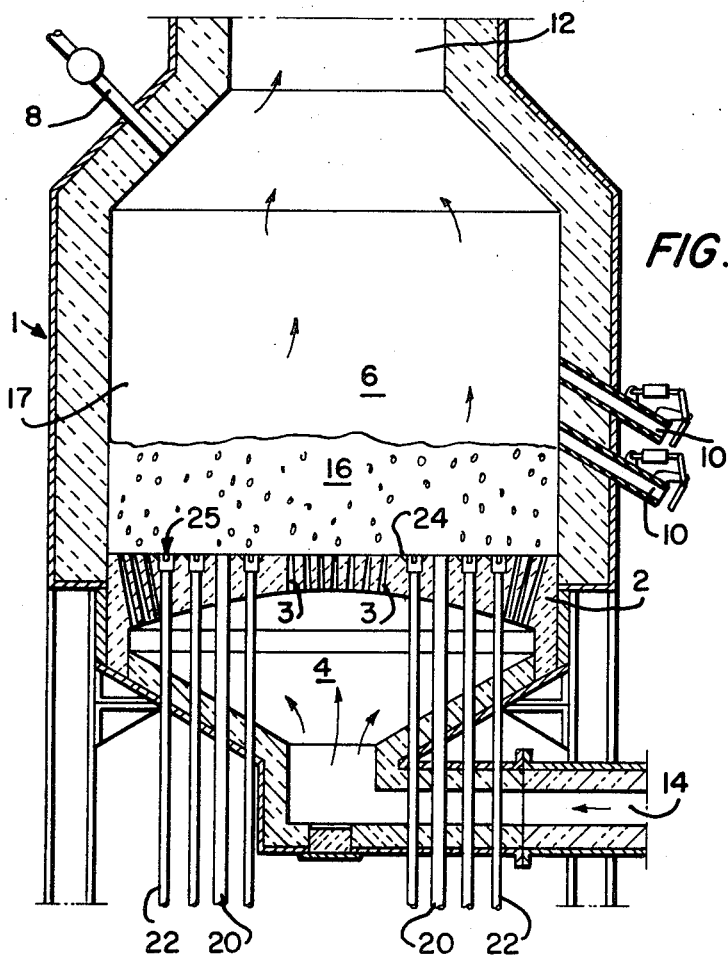
FIG. 1 is a sectional view of a fluidized solids reactor capable of using either gas or liquid fuel.

Referring to FIG. 1, there is shown a fluidized solids reactor which includes a vessel generally indicated at 1 having a gas permeable grid 2 mounted therein and dividing the vessel into a lower plenum chamber 4 and an upper material chamber 6. The grid is provided with a plurality of openings 3 permitting communication between the plenum 4 and the material chamber 6. The vessel is provided with a valved inlet 8 for material to make up the starting bed of material. A pair of valved outlets 10 are provided for discharging processed material. An outlet 12 is provided for exhausting gases from the material chamber 6.

A conduit 14 connects a source of air under pressure (not shown) and the plenum 4. Air from the source passes through the conduit 14 to the plenum 4 for passage through the openings 3 of the grid 2 to fluidize the granular material in the chamber 6 and from a fluidized bed of pulverulent material 16. A freeboard area 17 is formed in the chamber 6 above the fluid bed 16. Spent fluidizing gases are discharged to the outlet 12. A plurality of pipes 20 such as the pair shown in FIG. 1 extend through the plenum chamber 4 and the grid 2 and open into the material chamber 6. These pipes may be used for supplying raw material for carrying out a reaction in the bed 16.

A group of pipes 22 extend through the plenus 4 and the grid 2 and are used for supplying fuel to the material chamber 6 for burning within the bed 16. A nozzle generally indicated at 25 is flow connected to each of the pipes 22. Each nozzle may be mounted in a countersink recess 24 in the grid 2.

Figure 3:
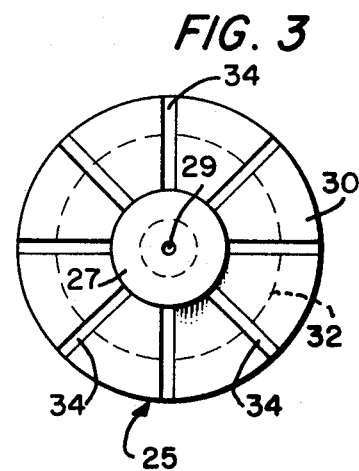
FIG. 3 is a top plan view of the nozzle of FIG. 2.
Figure 2:
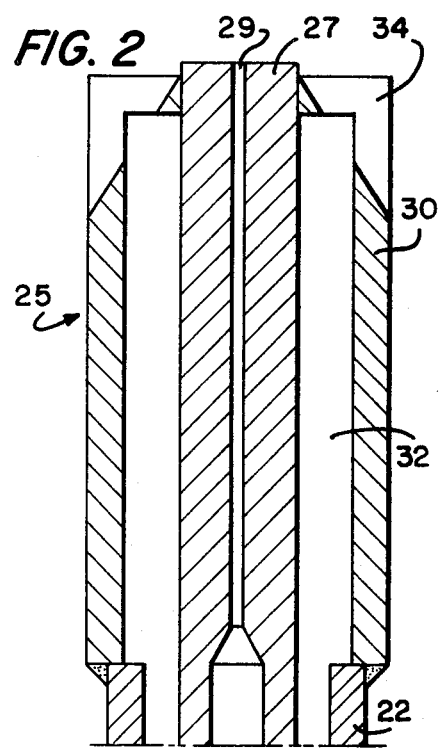
FIG. 2 is a sectional view on an enlarged scale of the nozzle of the present invention.

Referring to FIGS. 2 and 3, the nozzle 25 is shown in greater detail. The nozzle may include an inner pipe 27 having a longitudinal bore 29 therethrough open at its upper end. The nozzle further includes an outer pipe 30 concentric with the inner pipe 27 and suitably connected as by welding to the pipe 22. The concentric pipes 27 and 30 provide an annular passage 32. The top and side of the pipes 30 are provided with a plurality of radial slots 34 which permit communication between the annular area 32 and the fluidized bed 16.

Figure 4:
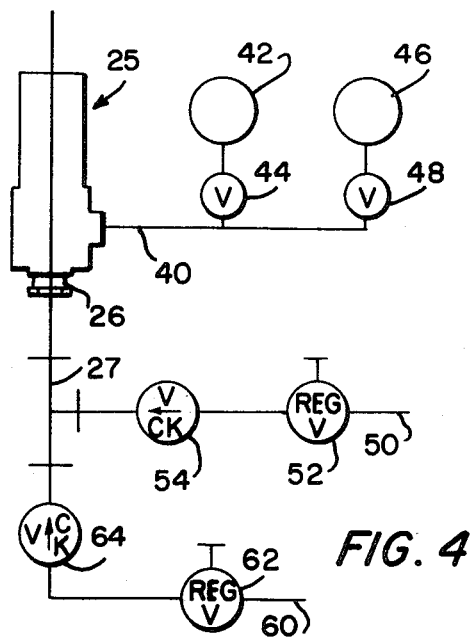
FIG. 4 is a diagrammatic view of the fuel supply system of the present invention.

Referring to FIG. 4, the fuel nozzle system of the present invention is diagrammatically shown. The conduit 22 is connected to a conduit 40. A source of gaseous fuel such as natural gas is generally shown at 42 and connected to the conduit 40 through a valve 44. A source of air under pressure such as a blower or compressor is indicated at 46 and connected to the conduit 40 through a valve 48. The valves 44 and 48 may be used to regulate the supply of gas or air, respectively, to the conduit 40.

A source of liquid fuel such as oil is connected to a conduit 50 which is provided with a regulating valve 52 and a check valve 54 and connected to the passage 29 of the inner pipe 27. A source (not shown) of air under pressure is connected to a conduit 60 through a regulating valve 62 and a check valve 64 to the conduit 29 of the inner pipe 27.

When it is desired to use a natural gas for a fuel, the valves 48, 52 and 62 are closed and valve 44 is opened. Natural gas is supplied from the source 42 to conduit 40 to pipe 22 and annular area 32. The gaseous fuel is discharged through the radial slots 34 into the fluidized bed 16 where it combines with the fluidizing air and burns within the bed 16 to carry out the thermal reaction. The slots 34 serve to disperse the gaseous fuel outwardly and upwardly into the fluidized bed 16 so that burning takes place throughout the fluidized bed. The countersink recesses 24 in the grid 2 serve to permit the dispersion of the gaseous fuel and permit the top of the nozzle to be substantially flush with the upper surface of the grid 2.

If it is desired to burn a liquid fuel in the reactor, the valve 44 is closed to shut off the supply of natural gas to the conduit 22 and annular area 32. The valve 52 is open so that liquid fuel can be supplied through conduits 50 to the conduit 29 of inner pipe 27. The liquid fuel is usually quite heavy and in order to disperse the fuel throughout the fluidized bed 16, the valve 62 is open so that air under pressure can be supplied through conduit 60 to pipe 27. This dispersion aids in the ignition of the liquid fuel. The check valves 54 and 64 serve to prevent back flow of air or oil into the lines 50 and 60, respectively.

By its very nature, the oil as it flows through the pipe 27 which is adjacent the hot fluidized bed 16 will become quite hot. It has been found that it is necessary to keep the pipe 27 relatively cool to keep the inner pipe 27 at a temperature below the carbonization point of oil. This will prevent the conduit 27 which must be small in diameter from becoming plugged and prevent the possibility of combustion taking place within the conduit 27. In order to cool the pipe 27, the valve 48 is open to supply air from the source 46 to the pipe 40 and the annular area 32. This air flows through radial slots 34 and serves as additional combustion air and fluidizing air. A packing gland 26 is provided at the connection of pipes 27 and 22 to close annular area 32 and permit relative expansion between the pipe 22 and the pipe 27.

The amount of air supplied through the pipe 60 to pipe 27 is controlled by regulating valve 62. It is desirable to keep the flow of oil through pipe 50 substantially constant in order to maintain a particular reaction temperature. The air flow through the pipe 27 is used to maintain the temperature in the fluidized bed and prevent burning in the freeboard area 17 above the fluid bed 16. The less the amount of air flow through pipe 60 and pipe 27 the more burning will take place above the bed because the air through pipe 60 serves to disperse the liquid fuel through the bed 16. Without this air or without enough air the oil will tend to flow directly through the bed 16 and burn above the bed. The amount of oil required is substantially fixed by the temperature required in the bed 16, i.e., a certain amount of oil is required to maintain the temperature in the bed. The amount of air is regulated to insure that the burning takes place within the bed and this may be determined by measuring the temperature in the bed and in the freeboard area above the bed. A high temperature within the freeboard area will indicate too much burning above the bed. If desired, suitable automatic controls may be used for sensing the temperature in the fluidized bed and the freeboard area above the bed and controlling the amount of air supplied through pipe 60.

From the foregoing, it should be apparent that the objects of this invention have been carried out. A reactor has been provided which is capable of using either gas or liquid fuel. If it is desired to change from a gaseous fuel to a liquid fuel, this may be done by a simple operation of control valves. The reactor need not be shut down to change the fuel supply. Further, a reactor has been provided which insures that the fuel is dispersed throughout the fluidized bed so that combustion takes place within the fluid bed.

It is intended that the foregoing be merely a description of a preferred embodiment and that the invention be limited solely by that which is within the scope of the appended claims.

I claim:

1. In a fluidized solids reactor including a vessel, a gas-permeable grid mounted in and dividing said vessel into a lower plenum chamber and an upper material chamber and adapted to support a bed of pulverulent material in the material chamber, means for supplying gaseous fluid to the plenum chamber for passage through the gas-permeable grid to fluidize the bed of pulverulent material, an outlet for discharging spent fluidizing gas from the material chamber, and means for supplying fuel to the material chamber for combustion in the fluidized bed of pulverulent material comprising:

nozzle means flow connected with the means for supplying fuel and dispersing the fuel into the fluidized bed of material, said nozzle means including a pair of concentric, hollow tubular members;

means flow connected to one of said tubular members for selectively supplying gaseous fuel to said nozzle means;

means flow connected to the other of said tubular members for selectively supplying liquid fuel to said nozzle means; and means flow connected to said tubular member which has said means for selectively supplying liquid fuel flow connected thereto for supplying air to said nozzle means when liquid is supplied to said nozzle means.

2. In a fluidized solids reactor according to claim 1, said means for supplying fuel further comprising means for supplying air to said one of said tubular members when said other tubular member is supplied with liquid fuel.

3. In a fluidized solids reactor according to claim 1, said nozzle means including an inner tubular member and an outer tubular member with the outer tubular member having a top with a plurality of radial slots in the top and sidewall for dispersing fluid outwardly into the fluidized bed of material.

4. In a fluidized solids reactor according to claim 3, said means for supplying gaseous fuel being connected to the outer tubular member, and said means for supplying liquid fuel and said means for supplying air are connected to the inner tubular member.

5. In a fluidized solids reactor according to claim 4, said means for supplying fuel further comprising means for supplying air to the outer tubular member when liquid fuel is supplied to the inner tubular member.

6. In a fluidized solids reactor according to claim 5, said means for supplying air to the inner tubular member including means for controlling the volume of air supplied to the inner tubular member.

* * * * *